Feb. 21, 1950     J. F. MacINDOE     2,498,090
LUBRICATOR

Filed Dec. 1, 1944

INVENTOR:
John F. MacIndoe,
BY
B. T. Wobensmith
Attorney.

Patented Feb. 21, 1950

2,498,090

UNITED STATES PATENT OFFICE 2,498,090

LUBRICATOR

John Franklin MacIndoe, Philadelphia, Pa.

Application December 1, 1944, Serial No. 566,081

7 Claims. (Cl. 184—45)

My invention relates to lubricators, and more particularly to lubricators in which the discharge area and the spring pressure are related for obtaining uniform discharge or flow of lubricant.

It is the principal object of the present invention to provide a lubricator having provisions for multiple range control of the flow of the lubricant.

It is a further object of the present invention to provide a lubricator in which the flow is regulated and controlled at different rates of flow.

It is a further object of the present invention to provide a lubricator in which the lubricant is propelled and directed in an improved manner during the operation thereof.

It is a further object of the present invention to provide a lubricator having improved resilient lubricant propulsion mechanism.

Other objects of the invention will be apparent from the specification and claims.

The nature and characteristic features of the invention will be more readily understood from the following description taken in connection with the accompanying drawings forming part hereof, in which.

Figure 1:
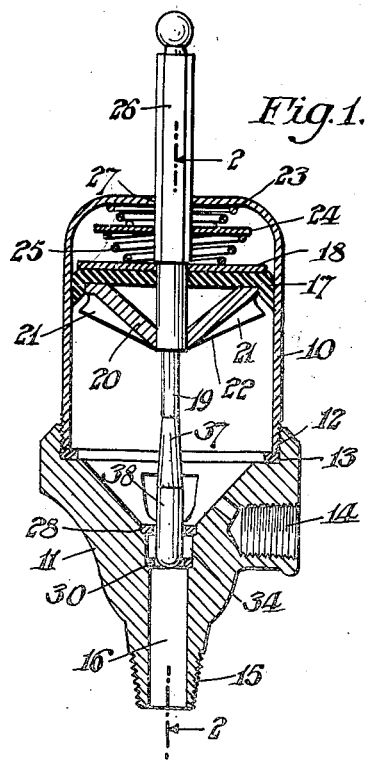
Figure 1 is a vertical central sectional view through a lubricator in accordance with the present invention and under one condition of filling.
Figure 2:
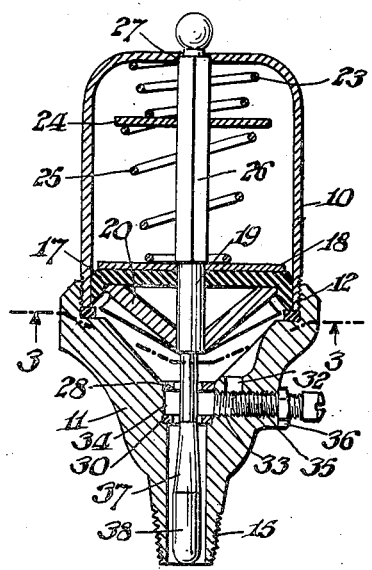
Fig. 2 is a vertical central sectional view taken approximately on the line 2—2 of Fig. 1 and showing the lubricator in discharged condition.
Figure 4:
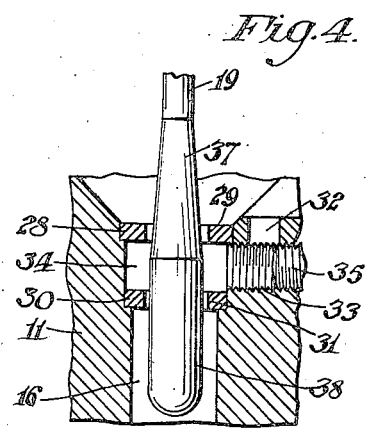
Fig. 4 is an enlarged fragmentary sectional view showing certain details of the control structure.

It should, of course, be understood that the description and drawings herein are illustrative merely, and that various modifications and changes may be made in the structure disclosed without departing from the spirit of the invention.

Referring more particularly to the drawings in the embodiment of the invention therein illustrated the lubricator preferably includes a barrel or cup 10 which is connected to a base portion 11 by means of suitable threads 12, a gasket 13 being provided for preventing fluid leakage and insuring a tight joint between the cup 10 and the base portion 11.

The base 11 has an inlet connection 14 for the introduction of the lubricant by means of a gun or other lubricant injector (not shown). The base 11 is provided with a lower threaded end 15 for mounting in the bearing to be lubricated and has a lubricant discharge opening or passageway 16 therein.

Within the barrel 10 a piston or plunger is mounted, preferably consisting of a cup washer 17 of neoprene, leather, or other suitable material, held in place by a pressure plate or disk 18 on a spindle 19.

Figure 3:
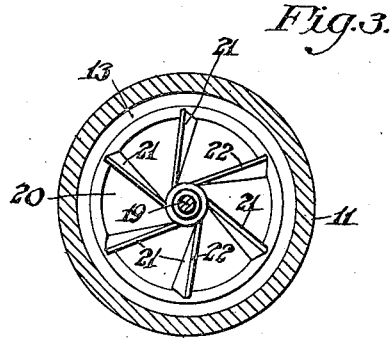
Fig. 3 is a sectional view taken approximately on the line 3—3 of Fig. 2.

On the lower side of the washer 17 a conical pressure applying member 20 is provided, the angle of the cone preferably being approximately 45 degrees. The lower face of the conical member 20 is provided with a plurality of vanes 21. The vanes 21 preferably have their lower terminal edges 22 inclined with respect to the lower face of the conical member 20 and are themselves inclined with respect to the lower face of the conical member 20 at an angle of the order of 35 degrees. The vanes 21 are preferably also tangentially arranged with respect to the lowermost edge of the conical member 20 (see Fig. 3).

Between the upper end of the barrel 10 and the pressure plate 18, a resilient impelling member having the desired force-displacement characteristics is provided and while single conical springs have heretofore been employed in force feed lubricator it is preferred, in order to obtain the desired application of spring force for flow control, to employ an upper conical spring 23, bearing at one end on the interior of the barrel 10 and at the other end on a spring washer 24, and a lower conical spring 25, bearing at one end on the spring washer 24 and at the other end on the pressure plate 18. The upper conical spring 23 is preferably made of heavier spring wire and with fewer turns than the lower spring 25. The forces applied through the spindle 19 to the piston or plunger for propulsion of the piston and controlled expulsion of the lubricant through the discharge opening 16, may be greater than heretofore possible, without sacrificing uniformity of flow throughout the movement of the spindle 19 and the piston carried thereby. The upper end 26 of the spindle 19 is preferably non-circular or polygonal and the barrel 10 is provided with a complementary shaped opening 27 through which the upper end 26 of the spindle 19 passes, for preventing rotation of the spindle 19 and the conical member 20 carried thereby. The upper end of the spindle 19 also serves as an indicator of the condition of filling of the barrel.

In the base 11 a control disc or washer 28 is provided having a control orifice 29 therein of predetermined size, and, spaced downwardly therefrom at a fixed location determined by the force-displacement characteristics of the spring 23 and 25, a second control disc or washer 30 is provided. The control washer 30 has a control orifice 31 therein of pre-determined size, and larger than the control orifice 29.

A bypass is provided in the base 11 consisting of a passageway 32 and a threaded bore 33, the bore 33 being in communication with the chamber or space 34 above the lower control washer 30. A bypass flow control screw 35 is mounted in the threaded bore 33 and is provided with a lock nut 36 for locking the same in the desired adjusted position.

The lower part of the spindle 19 is provided with control surfaces, preferably consisting of a control surface 37 of predetermined taper or slope and of predetermined length and a surface 38 of uniform diameter and of predetermined length, for purposes to be explained. The control surface 38 is of a length to provide, with the orifice 29, a uniform area for a portion of the down stroke of the plunger, dependent upon the characteristics of the impelling springs, and the control surface 37 is of a length to provide, with the orifice 29, a variable and increasing area during the remainder of the stroke of the plunger. The force applied by the springs 23 and 25 is substantially uniform for the first part of the stroke and during this part the control surface 38 is effective with the orifice 29. The force applied by the springs 23 and 25 decreases progressively upon extension, during the remainder of the stroke, and for this portion of the stroke the control surface 37 is effective with the orifice 29. When the bypass is open the control surface 38 is of a length to be effective with the orifice 31 for bypass control for the first part of the stroke and the control surface 37 is effective with the orifice 31 for the remainder of the stroke.

In the use of the lubricator lubricant is supplied to the interior of the barrel 10 through the inlet connection 14.

The piston or plunger is forced downwardly by the springs 23 and 25. The spindle 19 is prevented from turning by the engagement of the upper end 26 with the opening 27. The lower conical surface of the pressure applying member tends to force the lubricant towards the interior wall of the barrel 10 from which the lubricant is directed downwardly at an angle towards the control plate 28 for discharge through the discharge passageway 16, or the bypass passageway 32, or both. The vanes 21 by reason of their location tend to impart to the lubricant a rotary movement thereby aiding in the discharge thereof.

For normal minimum discharge the flow control screw 35 is positioned to cut off flow through the passageway 32 and bore 33. Upon downward movement of the plunger the control surface 38, in conjunction with the orifice 29 in the control plate 28, will provide for substantially uniform rate of flow or discharge of lubricant from the barrel 10 for the portion of the stroke of the spindle 19 at which the springs 23 and 25 are substantially uniform in their application of force. The control surface 37 is effective in conjunction with the orifice 29 during the remaining portion of the stroke of the spindle 19 while the force applied by the springs 23 and 25 is progressively decreasing. The orifice 31, because of its larger size, does not interfere with the control uniform flow of lubricant to the discharge passageway 16.

If more than the normal minimum rate of feed of lubricant is desired the bypass control screw 35 may be adjusted as desired and locked in the adjusted position by tightening the nut 36. Lubricant is then bypassed through the passageway 32 and the bore 33 to the chamber 34. Flow of the bypassed lubricant is controlled and maintained uniform by the control surfaces 38 and 37 successively acting on conjunction with the orifice 31 in the lower control plate 30. The use of the bypass fully open permits of an increase of flow of lubricant of the order of eight times the normal minimum discharge. Other and lesser increases above the normal minimum flow of lubricant are available by suitable adjustments of the control screw 35.

I claim:

1. A lubricator comprising a lubricant container having an outlet for connection to a bearing to be lubricated, means in said container for expelling the lubricant through said outlet, said expelling means including a resiliently actuated piston member and members carried by said piston member for imparting a rotary motion to the lubricant.

2. A lubricator comprising a lubricant container having an outlet for connection to a bearing to be lubricated, means in said container for expelling the lubricant through said outlet, said expelling means including a resiliently actuated piston member having a lower face for engagement with the lubricant and members on said face for imparting a rotary motion to the lubricant.

3. A lubricator comprising a lubricant container having an outlet for connection to a bearing to be lubricated, means in said container for expelling the lubricant through said outlet, said expelling means including a resiliently actuated piston member having a lower conical face for directing the lubricant towards the walls of said container, and vanes on said face for imparting a rotary motion to the lubricant.

4. A lubricator comprising a lubricant container having an outlet for connection to a bearing to be lubricated, a piston member linearly movable in said container for expelling the lubricant through said outlet, members for preventing rotation of said piston member with respect to said container, and resilient means for actuating said piston member, said resilient means including a plurality of continuously acting spring members in series and of different spring rates.

5. A lubricator comprising a lubricant container having an outlet for connection to a bearing to be lubricated, a piston member linearly movable in said container for expelling the lubricant through said outlet, members for preventing rotation of said piston member with respect to said container, and resilient means for actuating said piston member, said resilient means including a first conical spring member and a second conical spring member of different spring rate from and continuously effective in series with said first spring member.

6. A lubricator comprising a lubricant container having an outlet for connection to a bearing to be lubricated, a piston member linearly movable in said container for expelling the lubricant through said outlet, members for preventing rotation of said piston member with respect to said container, and resilient means interposed between said container and said piston member for actuating said piston member, said resilient means including a plurality of alined continuously acting series spring members of different spring rates.

7. A lubricator comprising a lubricant container having a base with an outlet passageway for connection to a bearing to be lubricated, means in the container including a resilient member for expelling the lubricant through said outlet passageway, an orifice member in said base interposed between the interior of said container and said outlet passageway, a second orifice member having an opening of larger area than said first orifice member in said outlet passageway spaced beyond and in alinement with said first orifice member, a bypass connection in said base connecting the interior of said container and the space between said orifice members, a member in said bypass connection adjustable to predetermined positions for determining the flow through said bypass connection, and a plunger member movable in said orifice members and actuated by said expelling means for controlling the delivery of lubricant to said outlet passageway, said plunger member having cylindrical and tapered surfaces for varying the effective area of said orifice members in accordance with the position of said expelling means.

JOHN FRANKLIN MacINDOE.

REFERENCES CITED

The following references are of record in the file of this patent:

UNITED STATES PATENTS

| Number | Name | Date |
|---|---|---|
| 906,720 | Kennedy | Dec. 15, 1908 |
| 1,168,646 | Kennedy | Jan. 18, 1916 |
| 1,222,851 | Craven | Apr. 17, 1917 |
| 1,283,841 | MacIndoe | Nov. 5, 1918 |
| 1,686,241 | MacIndoe | Oct. 2, 1928 |
| 2,359,905 | Folke | Oct. 10, 1944 |